United States Patent [19]

MacIntyre et al.

[11] Patent Number: 5,708,962

[45] Date of Patent: Jan. 13, 1998

[54] METHOD OF RECONFIGURING A DISTRIBUTED COMMUNICATION SYSTEM USING ALLOCATION LOADING LEVEL

[75] Inventors: John B. MacIntyre, Naperville; Kristin J. Cramer, Island Lake; Kevin L. Malm, Bartlett; Lee J. Kilayko-Domingo, Schaumburg, all of Ill.

[73] Assignee: Motorola, Inc., Schaumburg, Ill.

[21] Appl. No.: 378,758

[22] Filed: Jan. 26, 1995

[51] Int. Cl.$^6$ .................................................... H04B 1/60
[52] U.S. Cl. ............................. 455/8; 455/9; 455/520; 370/338; 370/457
[58] Field of Search ............................ 455/7, 8, 9, 11.1, 455/14, 15, 16, 17, 33.1, 51.1, 53.1, 54.1, 54.2, 56.1, 507, 520, 512; 370/97, 95.1, 95.3, 85.1, 85.2, 85.4, 85.7, 85.8, 453, 457, 338; 340/825.03, 825.04, 825.06, 825.44

[56] References Cited

U.S. PATENT DOCUMENTS

| | | | |
|---|---|---|---|
| 4,939,752 | 7/1990 | Literati et al. | 455/51.1 X |
| 5,349,584 | 9/1994 | Sticha et al. | 455/9 X |
| 5,392,449 | 2/1995 | Shaughnessy et al. | 455/8 |
| 5,513,378 | 4/1996 | Ranz et al. | 455/8 |
| 5,537,684 | 7/1996 | Cassidy et al. | 455/54.2 X |

*Primary Examiner*—Reinhard J. Eisenzopf
*Assistant Examiner*—Philip J. Sobutka
*Attorney, Agent, or Firm*—James A. Coffing; George C. Pappas

[57] ABSTRACT

The present invention encompasses a method of reconfiguring a distributed communication system (100). A typical distributed communication system (100) includes a plurality of repeaters (102–106) connected via a LAN (108, 110). When a repeater that is acting as an active master (104) receives a Trunking Status Pulse (118), the active master (104) will compare the status information in the received TSP (118) with the present status information to determine which active master is the favorable active master. The active master with the favorable present resource allocation loading level will continue to operate as the active master, while the active with the least favorable present resource allocation loading level will relinquish control as an active master.

12 Claims, 2 Drawing Sheets

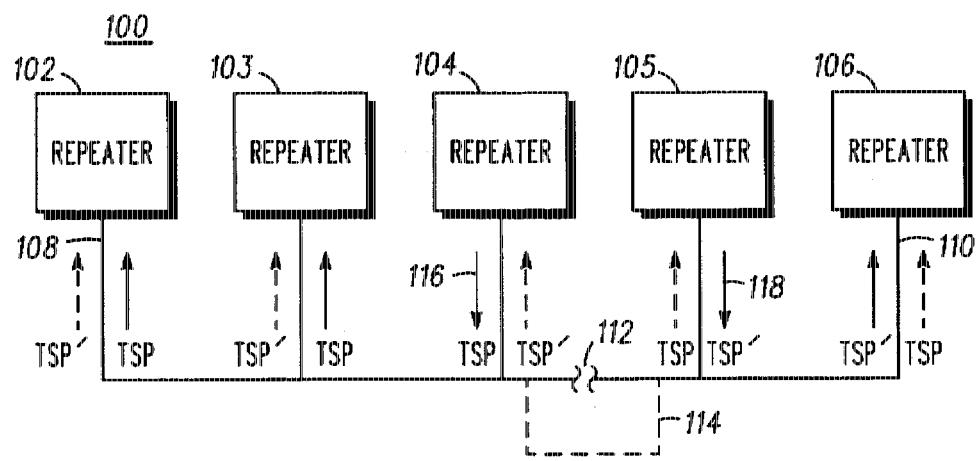

5,708,962

METHOD OF RECONFIGURING A DISTRIBUTED COMMUNICATION SYSTEM USING ALLOCATION LOADING LEVEL

FIELD OF THE INVENTION

The present invention relates generally to communication systems and, in particular, to reconfiguring a distributed communication system.

BACKGROUND OF THE INVENTION

Land mobile radio communication systems are known in the art. Such systems typically include a plurality of communication units, a plurality of repeaters, and a controller that controls resources and manages communication between the communication units.

Such a controller, commonly referred to in radio system parlance as an active master (AM), services the communication units as they migrate from site to site, keeping track of the communications that occur between the communication units, and the resources available at the system. If a communication unit attempts to start a communication when there are no resources available for the communication, the AM stores the request in a busy queue. After a resource becomes available for the communication, the AM alerts the communication units, via the control channel, of the resource availability and communication is established.

In current communication systems, however, if a new AM takes control (e.g., when the LAN fails or is physically disconnected), the new AM is not aware of the busy request. Thus, the communication unit is never alerted that a resource becomes available, since the new AM has no knowledge of the busied communication request.

One approach to solving this problem is to reset all repeaters whenever the presence of two active masters is detected. Though this does eventually restore the system to an operational state, it renders the system inoperable for as long as it takes the repeaters to initialize after power-up.

Accordingly, there exists a need for a method of reconfiguring a distributed communication system. In particular, a method is needed that allows a communication system to be reconfigured upon the detection of multiple active masters by determining which active master is better suited to retain the active master responsibilities.

BRIEF DESCRIPTION OF THE DRAWINGS

FIG. 1 shows a radio communication system, in accordance with the invention;

FIG. 2 shows a trunking status pulse, that might be employed in a preferred embodiment of the invention;

FIG. 3 shows an informational array, that might be employed in a preferred embodiment of the invention.

DETAILED DESCRIPTION OF A PREFERRED EMBODIMENT

Figure 4:
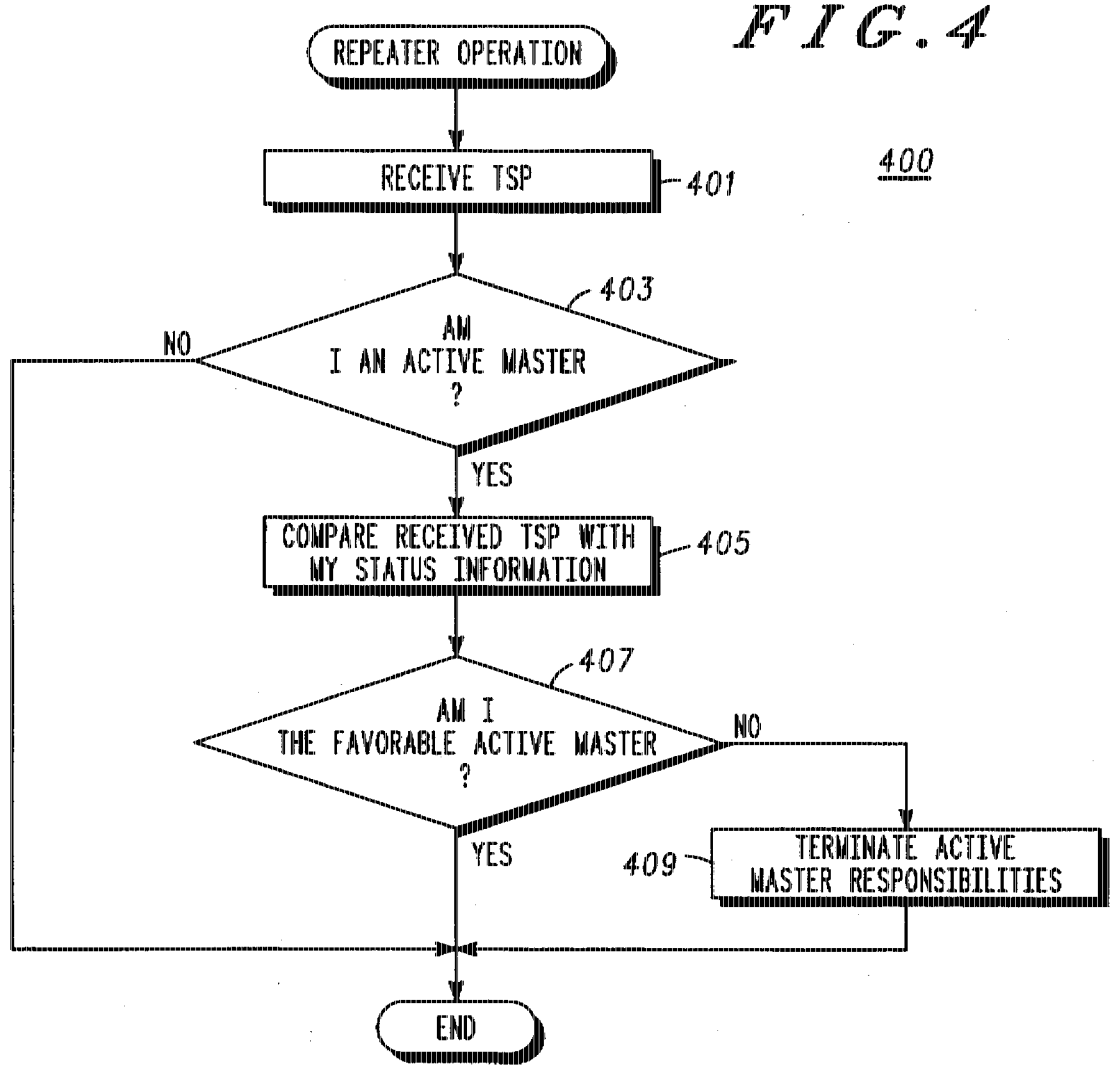
FIG. 4 shows a data flow diagram of a repeater in accordance with the present invention.

Generally, the present invention encompasses a method of reconfiguring a distributed communication system of repeaters. In the communication system, at least two of the repeaters serve as so-called "active masters" (AM) and the repeaters are coupled via a local-area-network (LAN). Once multiple active masters are identified, each active master provides status information detailing its present allocation loading level. Based upon this status information, the active master having a favorable present allocation loading level is selected to continue acting as the active master, while the other active master(s) relinquish(es) control of their active master responsibilities.

The present invention can be better understood with reference to FIGS. 1–4. FIG. 1 shows a simplified block diagram of a radio communication system (100), in accordance with the present invention. The communication system (100) includes repeaters (102–106) that are connected via a local area network (LAN, 108). When the LAN (108) is severed (112) (e.g., the result of a physical disconnection, faulty hardware, etc.), the communication system (100) effectively becomes two autonomous communication systems, where the effectively added system employs a second LAN (110), as shown.

In a typical configuration, each of these autonomous communication systems select a repeater that thereafter assumes control of the call processing and the resource management for that system. This so-called active master (AM) can be any repeater that is connected to other repeaters. For example, after the LAN break (112, as shown in FIG. 1) occurs, the AM repeater (104) periodically sends out, onto the LAN, an information-bearing pulse that alerts the other repeaters (102, 103) of status information within the system. These alert pulses, referred to herein as trunking status pulses (TSP, 116) each contain information about the communication system, as later described. Similarly, the AM repeater (i.e., 105) in the other autonomous system sends out an alerting pulse (118), denoted by TSP' and containing information about the resources available within its system. Upon reconnection (denoted by reference numeral 114) of the LAN, the two active masters determine which is the more favorable active master, as later described in accordance with the invention. (It should be noted that multiple active masters are detected when an active master unexpectedly receives a TSP, i.e., it expects only to be sending TSPs.)

FIG. 2 shows an exemplary TSP (200) (i.e., a block of data that is transmitted from the AM to other repeaters at the site), in accordance with the present invention. The TSP (200) includes fields for conveying information regarding site number (201), repeater number (203), TSP state (205), and user status (207). Likewise, information regarding site service (209), trunking status (211), transmitted outbound signaling words (OSW, 213), and active master information (215) is also conveyed.

The site number field (201) contains the site number of the active master's site, while the repeater number field (203) contains the repeater identifier for the presently operative AM. In a preferred embodiment, these fields are contained in the header of all messages sent on the LAN. Additionally, there are four different trunking states that a system may be in-wide-area trunking, site trunking, site failsoft, and site off. The TSP state field (205) contains the trunking state of the system at the time the TSP is transmitted on the LAN, and the user status field (207) contains the desired trunking state of the system. For example, the active master might desire the system to be in site trunking, but due to limited resources, the system might actually be in site failsoft.

The site service field (209) conveys the highest capability that the site can presently attain, while the zone controller trunking status field (211) conveys which trunking state is being requested by the wide-area controller. The transmitted OSW field (213) contains the last OSW that was transmitted by the control channel. This field is used to keep other repeaters' OSW queues up to date. OSW transmission is known in the art, and no further explanation is given here. The active master information field (215) is described with reference to FIG. 3.

FIG. 3 illustrates an example of entities that may be included in the active master information field (215). The active master information field (215) comprises a call activity record that contains, in a preferred embodiment, the number of emergency calls (301), the number of priority calls (302), the total number of calls (303), the trunking mode (304), and the total number of repeaters served (305). The values of these fields are compared to determine which active master is the favorable active master, as later described with reference to FIG. 4.

The emergency calls field (301) contains the number of active emergency calls being processed by the active master. In a preferred embodiment, the emergency calls field (301) is the first entity considered in determining which of the presently operating active masters is the most favorable. In a preferred embodiment, emergency calls have priority over all other call types. Therefore, the active master processing the higher number of emergency calls is preferably chosen to remain the active master. The priority calls field (302) contains the number of active priority calls that are being processed by the active master. Examples of priority calls are group-regrouping calls, secure calls, etc., as known in the art.

The total calls field (303) contains the total number of calls presently being processed by the active master. The trunking mode field (304) contains the trunking mode of the active master. In a preferred embodiment, the possible trunking modes include (in order of most desirable to least desirable) wide-area-trunking, site trunking, site failsoft, and site off. The repeaters served field (305) contains the total number of repeaters that the active master can presently communicate with, via the LAN. As noted earlier, these fields (i.e., 301–305) are used in combination to determine the most favorable active master, as described in FIG. 4.

FIG. 4 shows a data flow diagram (400) depicting the operation of a repeater, in accordance with a preferred embodiment of the invention. Upon receipt (401) of a TSP, the repeater determines (403) whether it is currently an active master. If the repeater is not currently serving as an active master, the repeater processes the TSP as in the prior art. However, when the repeater is determined to be presently serving as an AM, the repeater compares (405) the status information in the received TSP with the status information in its own TSP, as next described.

In a preferred embodiment, the active master information (215) is used to determine which active master is preferred and should therefore remain operating as an active master. The hierarchy to determine which active master is the preferred active master is designed to place the most weight on the most important information. Therefore, the number of emergency calls present is preferably the first field evaluated when determining which active master should retain active master responsibilities, The next field looked at, in the instance when the number of emergency calls on the two active masters is identical, is the number of priority calls present. The active master with the most priority calls currently active will retain active master responsibilities.

If the number of emergency calls and priority calls are equal, the next criteria in the hierarchy is the total number of calls present on each active master. The active master with the higher number of calls active will retain active master responsibilities.

If all three call fields are identical between the two active masters, the next field inspected is the trunking mode. If one of the active masters is in a higher trunking mode than the other active master, it should retain its active master responsibilities, since the goal of trunked communication systems is to be in the highest trunking mode possible at all times. Recall that the trunking mode ranking, from most desirable to least desirable, is wide-area trunking, site trunking, site failsoft and site off.

The last selection criterion in a preferred embodiment of the invention is the number of repeaters served by each active master. The active master serving the greater number of repeaters is important, as that repeater will require the least amount of updating when the other repeaters (i.e., those formerly served by the other active master) begin to report their status information to the new active master. This effectively lessens the number of updates required, thereby decreasing the amount of traffic placed on the LAN after re-connection.

Relying on the above comparisons, the repeater determines (407) whether it is the favorable active master. If not, the repeater terminates (409) any active master responsibilities, e.g., call processing and resource management of the system. If it is determined to be the more favorable active master, the repeater continues operating as the active master.

The present invention provides a method of reconfiguring a distributed communication system. This is accomplished by identifying an active master and providing status information indicative of the present resource allocation loading level at each active master. Once the resource allocation loading level is determined, one of the active masters is selected as having a favorable present resource allocation loading level, based upon the status information. By determining which active master is the favorable active master, the problems of the prior art are substantially eliminated. In particular, communications are allowed to continue without the disruptive influence resulting when all repeaters in a communication system are reset. The communication systems are also more reliable than prior art systems, as busy requests no longer get dropped when a new active master assumes control of a communication system.

What is claimed is:

1. In a distributed communication system that includes a plurality of repeaters for facilitating communications throughout the distributed communication system, at least two of the plurality of repeaters constituting active masters responsible for allocating a plurality of communication resources, the plurality of repeaters being coupled via a local area network (LAN), a method of reconfiguring the distributed communication system, the method comprising:

identifying the at least two of the plurality of repeaters, to produce an identified first active master and an identified second active master;

at the identified first and second active master, providing status information indicative of its present resource allocation loading level;

comparing, at a detecting one of the identified first active master and the identified second active master, received status information with status information generated by the detecting active master; and selecting, using at least the status information, from among the identified first and second active master, an active master having a favorable present resource allocation loading level.

2. The method of claim 1, wherein the step of identifying comprises the step of receiving, at at least one of the identified first active master and the identified second active master, unexpected status information.

3. The method of claim 1, wherein the step of providing comprises the step of providing a call activity record.

4. The method of claim 3, wherein the step of providing the call activity record comprises the step of providing a total number of calls.

5. The method of claim 3, wherein the step of providing the call activity record comprises the step of providing at least a first call type.

6. The method of claim 5, wherein the step of providing at least a first call type comprises the step of providing an emergency call identifier.

7. The method of claim 5, wherein the step of providing at least a first call type comprises the step of providing a priority call identifier.

8. The method of claim 3, wherein the step of providing the call activity record comprises the step of providing a trunking mode identifier.

9. The method of claim 8, wherein the step of providing a trunking mode identifier comprises the step of providing a wide-area trunking mode identifier.

10. The method of claim 3, wherein the step of providing the call activity record comprises the step of providing an indication of a number of repeaters served.

11. The method of claim 1, wherein the step of comparing comprises the step of comparing a total number of active calls.

12. The method of claim 1, wherein the step of comparing comprises the step of comparing a predetermined ranking of call types.

* * * * *